HIGH FREQUENCY TO LOW FREQUENCY SYNCHRONOUS POWER CONVERTER

Filed June 19, 1967 5 Sheets-Sheet 1

INVENTORS
RICHARD M. IRELAND
CREIGHTON S. WARREN
WILLIAM R. FELDKAMP

Joseph J. Gross

ATTORNEY

HIGH FREQUENCY TO LOW FREQUENCY SYNCHRONOUS POWER CONVERTER

Filed June 19, 1967 5 Sheets-Sheet 2

INVENTORS
RICHARD M. IRELAND
CREIGHTON S. WARREN
WILLIAM R. FELDKAMP by Joseph J. Gross

ATTORNEY

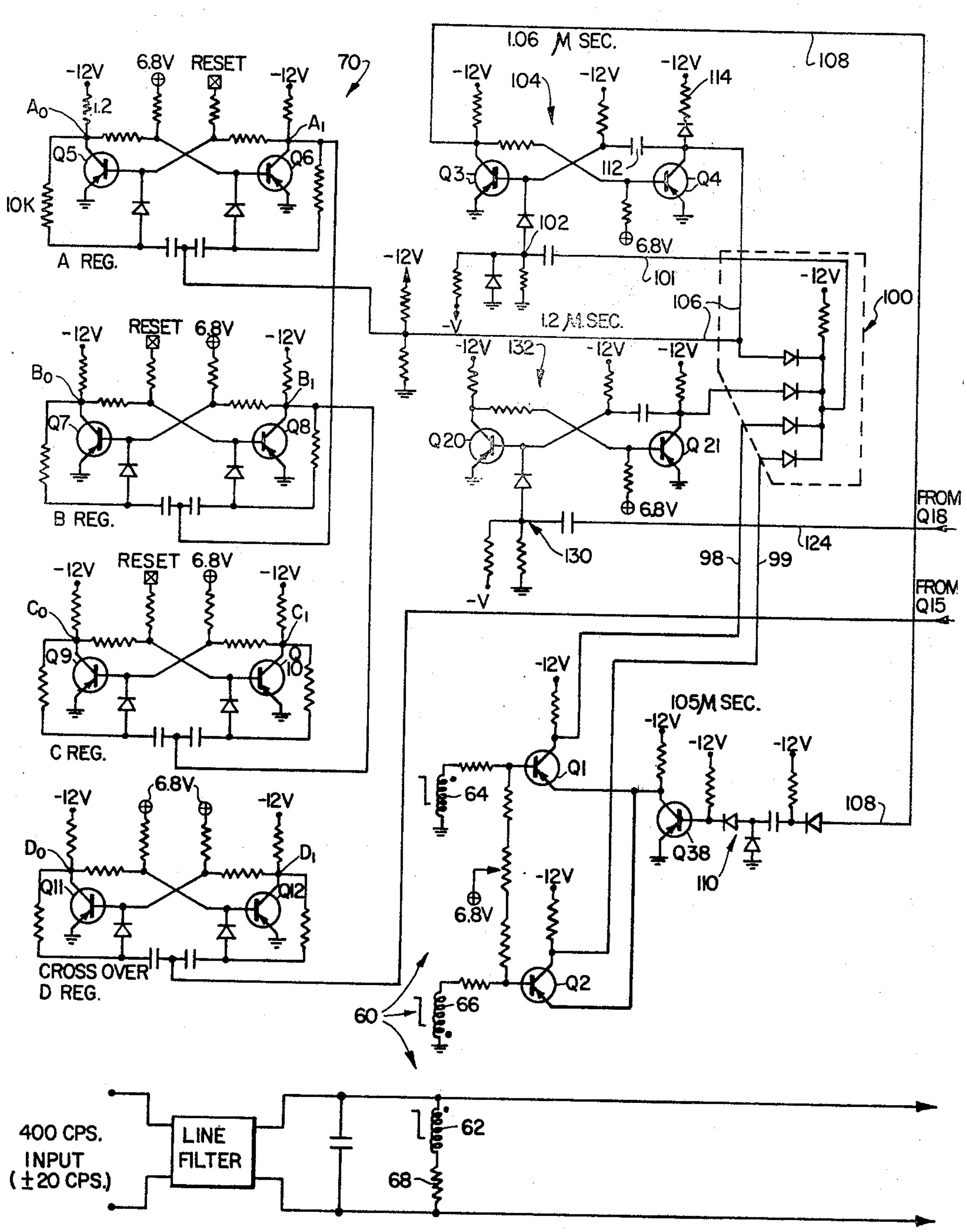
Fig. 4A
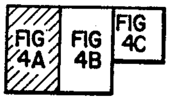
INVENTORS
RICHARD M. IRELAND
CREIGHTON S. WARREN
WILLIAM R. FELDKAMP
by Joseph J. Grass
ATTORNEY

HIGH FREQUENCY TO LOW FREQUENCY SYNCHRONOUS POWER CONVERTER

Filed June 19, 1967 5 Sheets-Sheet 4

INVENTORS
RICHARD M. IRELAND
CREIGHTON S. WARREN
WILLIAM R. FELDKAMP
by Joseph J. [signature]
ATTORNEY

HIGH FREQUENCY TO LOW FREQUENCY SYNCHRONOUS POWER CONVERTER

Filed June 19, 1967 5 Sheets-Sheet 5

INVENTORS
RICHARD M. IRELAND
CREIGHTON S. WARREN
WILLIAM R. FELDKAMP
by Joseph J. Gran
ATTORNEY

United States Patent Office 3,493,843
Patented Feb. 3, 1970

3,493,843
HIGH FREQUENCY TO LOW FREQUENCY SYNCHRONOUS POWER CONVERTER

Richard M. Ireland, Long Grove, and Creighton S. Warren, Chicago, Ill., and William R. Feldkamp, Bristol, Wis., assignors to SCM Corporation, New York, N.Y., a corporation of New York Filed June 19, 1967, Ser. No. 646,860
Int. Cl. H02m *5/00*
U.S. Cl. 321—61 21 Claims

ABSTRACT OF THE DISCLOSURE

Apparatus having a direct circuit connection from a single phase, high frequency alternating current power source through solid state frequency conversion circuits to single phase, lower frequency load or output terminals. The frequency conversion circuits include two full-wave gate controlled rectifier bridges of opposite rectifying polarity connected in parallel between the input source terminals and the load or output terminals. The bridges are alternately rendered operative by a control circuit which includes a counter circuit and a bridge selecting or transfer register, the counter being connected to count successive half-waves of the input power source and the register being cyclically and successively responsive to a predetermined count to alternately render only one of the bridges operative for positive rectification of a predetermined number of input source half cycles and then to render only the other of the bridges operative for negative rectification of the same predetermined number of input source half cycles. The control circuit includes inhibiting circuitry responsive to the predetermined count in the counter to render both bridges inoperative for at least one-half of an input cycle whenever the operative and inoperative conditions of the two bridges are reversed.

BACKGROUND OF THE INVENTION

The present invention relates to a frequency converting system and is more particularly related to a system for adapting low frequency A.C. motors, such as those used in data communication equipment, to be connected to a high frequency power source.

Until the development of this invention, 50 to 60 cycle motors in data communication systems, as well as other motor operations, required 50 or 60 cycle power inputs to operate successfully and whenever the input frequency was at a higher level, different and generally higher speed motors were needed. For instance, when the available power input was at or near the 400 c.p.s. level, a 400 cycle motor with speed reduction gears could and, prior to the present invention, would in all probability be used. However that did present problems because, under conditions of continuous usage, the bearings in those high speed motors required replacement about once a year and at the same time the speed reduction gears required replacement. Quite often, at system field installations there are no technicians capable of properly replacing the motor bearings and/or gears so the repair technique is usually removal and replacement of the entire motor. 400 cycle A.C. motors with reduction gears, particularly, of the type under consideration, are extremely expensive and periodic replacement will compound the overall expense of the system in which they are used.

Using the present invention, which can be inserted as a self contained unit in the power connection, even when the power source is 400 cycle A.C., ordinary 50 to 60 cycle A.C. motors can be substituted for the more costly 400 cycle A.C. motors and the lower cost motors will perform quite successfully. The 400 cycle input frequency and 50–60 cycle output frequency are used as examples and it is to be understood that the inventive system can be used with inputs and outputs at different frequencies and also that the conversion ratio can be different from the 7:1 example being discussed.

SUMMARY OF THE INVENTION

A primary object of this invention resides in the provision of a novel frequency conversion system providing a direct circuit between a higher frequency power source and a load at lower frequency, enabling a reduction in normal cost and maintenance of A.C. motor driven equipment, such as data communication printers and perforators, because of the substitution of less expensive 50 to 60 cycle A.C. motors in place of more costly 400 c.p.s. A.C. motors. In conjunction with this object, a further object resides in construction of the conversion system as a solid state package for connection between high frequency source and low frequency load terminals.

A further object resides in the provision of a frequency convertor which will reduce high frequency A.C. source power to a lower frequency load output through novel circuitry including gate controlled positive and negative rectifying bridges, the bridge inputs being connected in parallel across the high frequency input lines and the bridge outputs being connected in parallel across the output lines, together with control components for alternately turning "on" the control gates of the rectifier bridges responsive to a time division of the half cycles of the high frequency source for enabling output rectification, at one polarity, of a specified number of half cycles of the power source and then enabling rectification, at the other polarity, of an equivalent number of half cycles of the power source.

In conjunction with the previous object a further object resides in the provision of novel control circuitry which automatically provides a period of zero output rectification during a time space interval between rectification at opposite polarities through the bridges.

In further conjunction with one or both of the preceding two objects is the provision, within the novel control components, of solid state components which sense, count and are responsive to successive predetermined counts of half cycles of the power source for alternately switching gated control between alternate ones of the rectifier bridges to provide a reduced frequency alternating current output.

In conjunction with the preceding object, a further object, resides in providing novel counter controls for triggering a bridge control cross-over register with feedback controls including a count blanking gated circuit enabling inhibition of high frequency rectification for at least a count of one of the high frequency power source half cycles.

Further novel features and other objects of this invention will become apparent from the following detailed description, discussion and the appended claims taken in conjunction with the accompanying drawings which show a preferred construction and embodiment.

GENERAL DESCRIPTION

Figure 1:
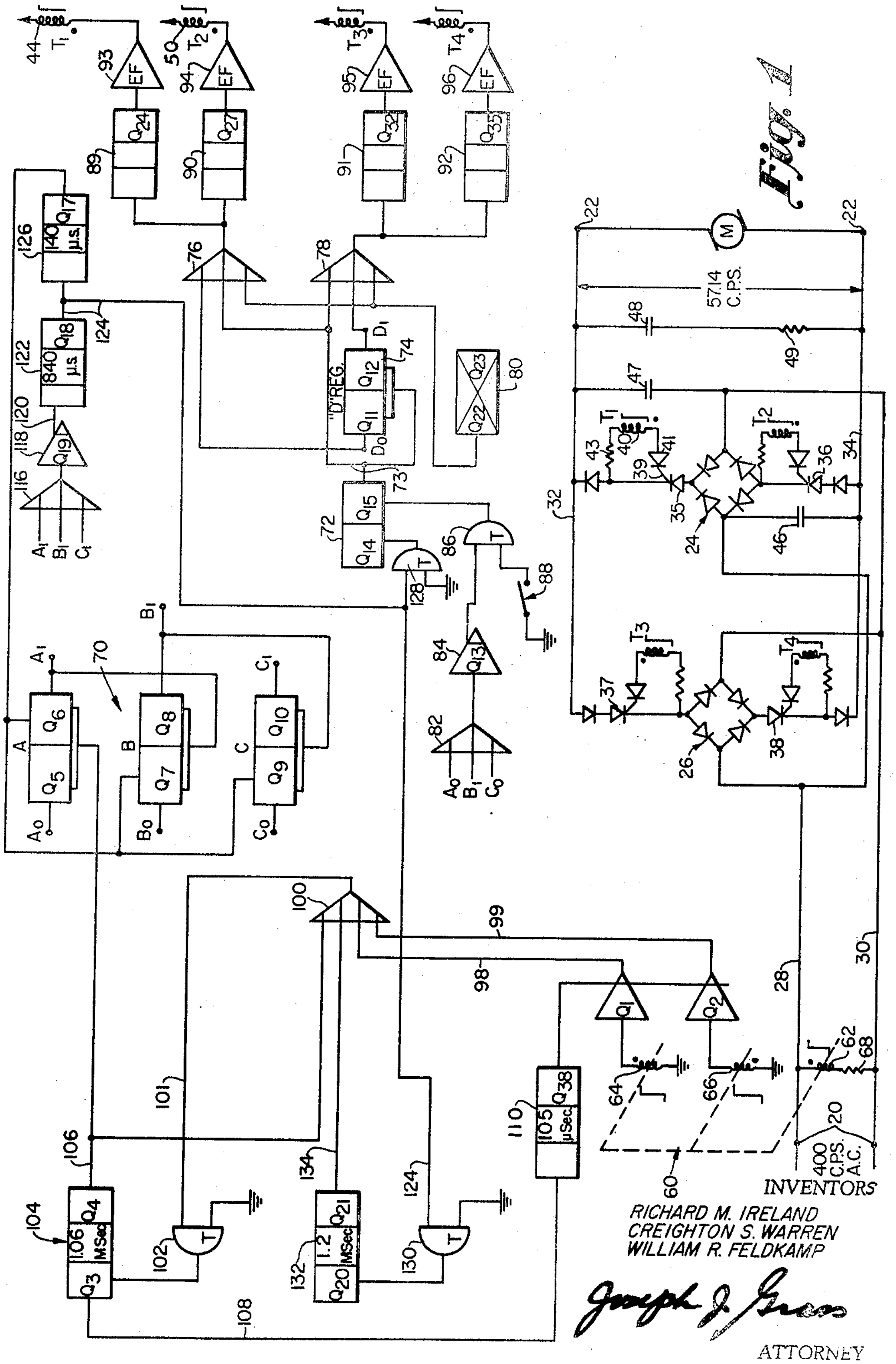
FIGURE 1 is a block diagram using logic symbols to illustrate the various components and system of the disclosed embodiment of the invention.

The system circuit, in general, consists of two SCR controlled full-wave rectifier bridges placed in circuit between a high frequency A.C. source (400 cycle), and low frequency output terminals or load terminals in combination with an electronic control package which senses and counts the half cycles of the high frequency power source and supplies triggering potential to the gate circuits of the SCR's in either the positive or the negative bridge circuit. The condition of a cross-over register within the control package determines which bridge circuit, positive or negative will be gated to an operative condition. This will be explained in greater detail later in this description. In the exemplary disclosure the output terminals from the two bridge circuits are connected to a 50 or 60 cycle A.C. motor, although connection could be to some other 50–60 cycle load, and the frequency conversion is from 400 cycles to 57.14 cycles. Power for the control package is D.C. at various levels and can be derived from a D.C. power unit in a manner well-known to those skilled in the art.

If the exemplary 400 cycles of the high frequency A.C. source is divided by 7, the result will be a frequency of 57.14 cycles. Accordingly, seven (7) cycles of 400 c.p.s. A.C. power source are used to provide one (1) cycle of 57.14 c.p.s. A.C. source. Before proceeding to a detailed description, the following paragraphs provide a general description of how the control package accomplishes the conversion.

A square loop core signal transformer 60 with its primary winding 62 in series with a load resistor 68 shunted across the 400 cycle line, provides alternate half-cycle signal pulses to the control package which utilizes such pulses to sense each time the 400 cycle current changes polarity. The signal current realized through signal transformer 60 will be essentially in phase with the source (400 cycle) voltage. By means of circuits in the control package, including a counter, 6 successive half cycles of the 400 cycle line are sensed and counted and, during these 6 half cycles, the gate circuits of the SCR's in the "positive" bridge circuits are subjected to higher frequency pulses to gate those SCR's to their operative or "on" condition. The control package inhibits the counter from counting the seventh half cycle pulse and during that inhibited half cycle period the gate circuits of all of the SCR's in both bridges are "off." With both bridge circuits inhibited, the voltage across the load is zero (or decreasing toward and through zero) during the seventh half cycle input pulse. The foregoing is a very brief description of generation of the positive half cycle of a 57.14 cycle wave and the negative half cycle of the 57.14 cycle wave which follows the seventh pulse is generated in a similar manner by utilizing the next six of the 400 cycle half cycles. The initiation of the frequency converting operation may occur through either the positive or negative rectifying bridge. For convenience in describing the operation it will be assumed that the system starts at the beginning of a positive output cycle.

Should a different load operating output frequency be desired, the exemplary system is capable of dividing 400 cycles by any of the numbers 1 through 8 merely by changing connections from the counter outputs to a cross-over diode gate 116. Thus, dividing the power source 400 c.p.s. by 8 provides a 50 cycle output; by 7 provides 57.14 cycles; by 6 provides 66.66 cycles; etc. By increasing the counting capability of the counter the frequency can be further divided. Furthermore, the system can be used with a different high frequency input whereupon the output frequency would be proportionately different.

DETAIL DESCRIPTION

The system circuit is hereinafter described in detail, primarily with reference to the FIGURE 1 logic diagram supplemented by reference to the timing and pulse count diagrams of FIGURES 2 and 3. Reference will be made to the schematic circuit diagram of FIGURES 4 and 5 as necessary for specific details.

The lower portion of FIGURE 1 illustrates a direct circuit from terminals 20 of a 400 c.p.s. alternating current power source to terminals 22 at 57.14 c.p.s. The circuit includes two oppositely poled, full wave rectifier bridges 24 and 26, bridge 24 being poled to provide "positive" potential at its output vertices and bridge 26 being poled to provide a reversed or "negative" potential at its output vertices. Power input leads 28 and 30 connect from power source terminals 20 through parallel branch leads to the input vertices of both the positive bridge 24 and negative bridge 26. Parallel branch lines connect the bridge output vertices to the load terminal output leads 32 and 34. Each of the parallel output branch lines includes a gated rectifier, i.e., an SCR. The two SCR's 35 and 36, which are in the circuit connection from the output vertices of the positive bridge 24, are poled in the same sense as the associated bridge rectifier components and pass alternating pulses from the input source to the out-put leads 32 and 34 in a positive direction only when both of SCR's 35 and 36 are gated "on." Similarly, the two SCR's 37 and 38, connected in the circuit from the output vertices of the negative bridge 26 are poled in the same sense as the rectifier components in that negative bridge and pass alternating pulses from the input source to the output leads 32 and 34 in a negative sense only when both of SCR's 37 and 38 are gated "on." Only one of the bridges 24 and 26 is rendered operative at a time, and is placed in an operative condition by simultaneous gating of both of its associated SCR's to an "on" condition.

Figures 4A, 4B, 4C:
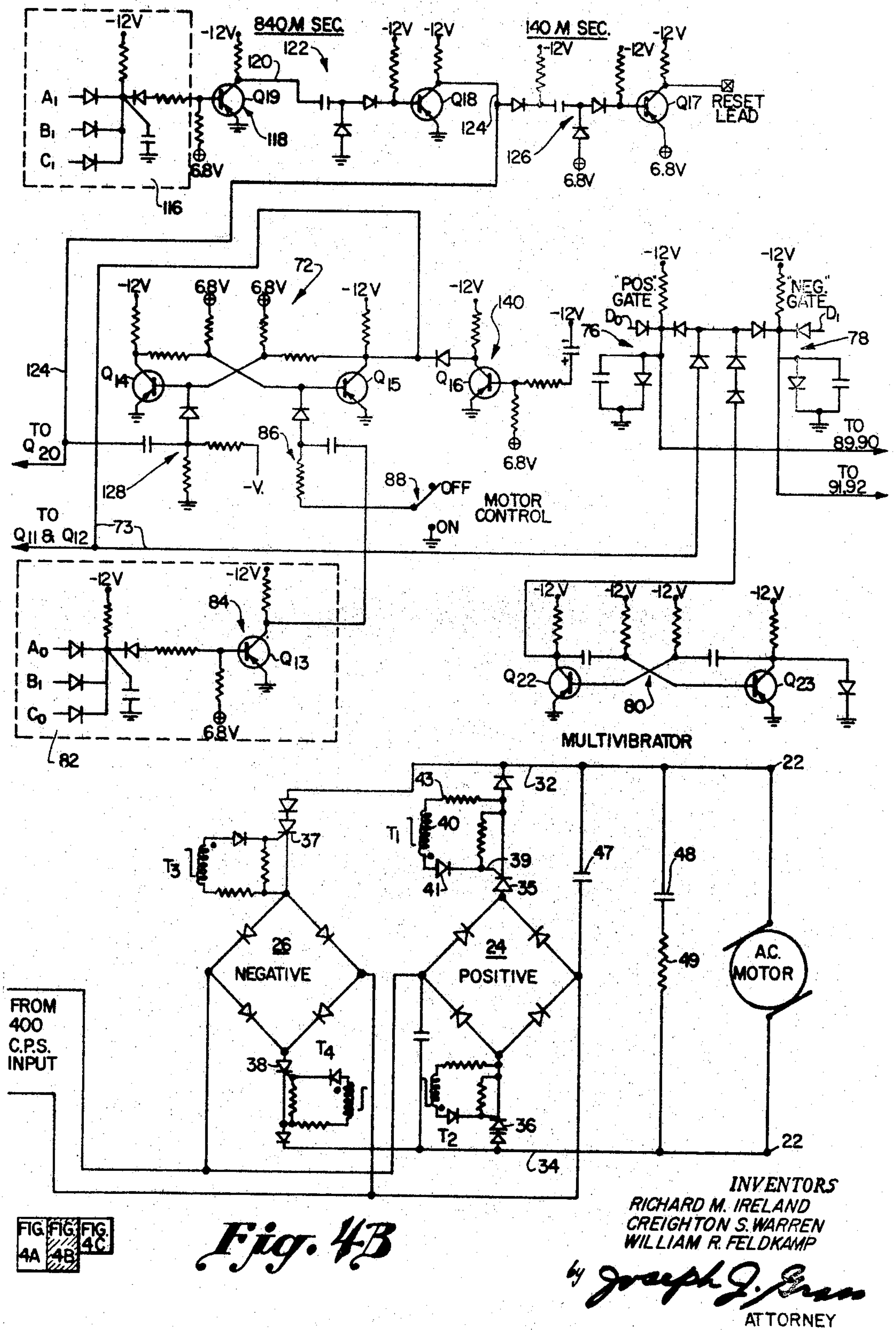
FIGURES 4A, 4B and 4C, when assembled in the manner noted by the small block legend adjacent each figure, is a circuit schematic of the system shown in FIGURE 1.

Similar control circuits are provided for each gate of each of the SCR's 35, 36, 37 and 38 and hence only one will be described. Conduction through an SCR, e.g., SCR 35 can begin when a positive potential is applied at its gate lead 39 for a momentary period of time. The control potential is applied to gate lead 39 via the secondary winding 40 of a transformer T1, which transfers SCR gating control pulses from the control circuitry, to be described hereinafter, and through a diode 41 to the associated one of the bridge controlling SCR's. The circuit from the T1 secondary winding is completed through a resistance 43 to the cathode lead of SCR 35. A separate square loop core control signal transformer T1, T2, T3, and T4 is used, respectively, for each of SCR's 35, 36, 37 and 38, and as schematically depicted in FIGURE 4C, each of the signal transformers T1, T2, T3 and T4 has three windings of which only two are shown in FIG. 1. The third windings are shown in FIG. 4C. Referring again specifically to transformer T1, the third winding 42 is a bias winding. Such a circuit is desirable to protect the SCR gate from false triggering due to power supply variations or transient pick-up. When a control pulse is applied to an SCR control transformer T1, T2, T3, or T4, it changes the core of that transformer from an "0" state to a "1" state. When the control signal is removed, the back bias winding 42 returns the square loop core from "1" state back to "0" state and a positive potential is no longer applied to the associated SCR gate lead, e.g., lead 39 of SCR 35, and when the voltage wave then being rectified changes direction, that SCR will cease to conduct.

The main windings of the SCR control transformers T1, T2, T3 and T4 are shown at the upper right hand edge of FIG. 1. The "positive" set of signal transformers, T1 and T2, are always pulsed simultaneously and the "negative" set of signal transformers, T3 and T4, are also always pulsed simultaneously. The two sets are never pulsed together. It will be apparent from the foregoing description that pulsing of main windings 44 and 50 respectively of signal transformers T1 and T2 will gate "on" the positive bridge control SCR's 35 and 36 enabling positive rectification of the 400 cycle half waves and pulsing of main windings 52 and 54 respectively of signal control transformers T3 and T4 will gate "on" the negative bridge control SCR's 37 and 38, enabling negative rectification of the 400 cycle half waves.

Capacitors 46, 47 and 48 and resistance 49 constitutes an output filter connected in series across the A.C. input and output lines to effectively eliminate the pulsating D.C. in each half cycle of the output.

CONTROL CIRCUITRY

The timing for alternately rendering the two full wave rectifying bridges 24 and 26 operative is derived from the frequency of the alternating input source and is accomplished by a control circuit which senses, counts and divides the input source half cycles and alternately controls the two sets of SCR signal control transformers T1 and T2 or T3 and T4 during appropriate time intervals to provide the output A.C. at terminals 22 with a desired lower frequency.

The following description includes a general and relatively broad explanation of the major control circuit components and their functions followed by a more detailed description.

In FIGURE 1 (lower left hand corner), the cycle sensing square core transformer 60 with main winding 62 and secondary windings 64 and 66 is used as a signal generator and transmitter which provides control circuit input signals responsive to each half cycle of the A.C. power source. The secondary windings 64 and 66 are oppositely phased with respect to each other. Main winding 62 of signal transformer 60 is connected in series with a load resistor 68 across the power source input lines 28 and 30.

By using appropriate components, such as amplifiers, gates and delay one-shots, more fully described hereinafter, the half cycle signals derived through signal transformer 60 are used to provide count triggering pulses to a 3 stage binary counter 70. At a specified selected count condition, outputs of counter 70, which provide a representation of that selected count (e.g., the count of "six") are utilized to provide triggering of a cross-over control register 72, which controls the cross-over (or transfer) of the system output power from one to the other of rectifier bridges 24 and 26. Cross-over control register 72 is triggered to its "set" condition after the counter reaches the selected specified count. Each time it is "set," the transition on its output lead 73 triggers a bi-stable flip-flop, designated as the cross-over D register 74. The D-register has two outputs identified as $D_o$ and $D_1$ which, depending upon its bi-stable condition, inhibit one or the other of a "positive" and "negative" pulse control gate, respectively identified as gate 76 and gate 78.

A free running multivibrator 80 has its output connected to inputs of each of the "positive" pulse control gate 76 and the "negative" pulse control gate 78 and through those gates provides the triggering pulses which actuate the SCR signal control transformers T1 and T2 or T3 and T4.

Considering the "positive" and "negative" pulse control gates 76 and 78: (1) one or the other is always inhibited by the D-register 74 from passing the multivibrator pulses to control the "positive" set of transformers T1 and T2 or the "negative" set of transformers T3 and T4 and, through the transformers and the associated bridge control SCR's, render either one or the other of the "positive" or "negative" rectifying bridges 24 and 26 operative; and (2) both gates 76 and 78 are inhibited whenever the cross-over control register 72 is in its "set" condition and therefore in that "set" condition neither of the rectifying bridges 24 and 26 will be rendered operative.

It will be apparent from the foregoing brief description of the control circuit that, to enable output from either of the rectifying bridges, the cross-over control register 72 must be in its "reset" condition. The register 72 is triggered to "reset" through suitable diode gating 82 by an output signal from counter 70 which represents a "one" count.

The trigger circuit from gate 82 to register 72 includes an inverter 84 which has its output connected through a pedestal gate 86 to the reset input of the cross-over control register 72. The grounded second input to the pedestal gate 86 includes an "on-off" system output control switch 88, which must be closed to render pedestal gate 86 operative to pass the "one" count signal received from diode gate 82 to reset the cross-over control register 72 and remove its inhibiting signal from the positive and negative gates 76 and 78 leaving those gates under selective control by the D-register 74 and signal pulsing control of multivibrator 80. When the system output control switch 88 is open, the cross-over control register cannot be triggered to "reset" and will maintain the bridges 24 and 26 in their inoperative condition and there will be no output on leads 22.

DETAIL CONTROL CIRCUIT DESCRIPTION

When the system is rendered operative, the control circuit will count and permit rectification through one of the two rectifier bridges 24 and 26 of six half cycles, of the 400 c.p.s. power source. The control circuit then transfers rectification operations to the other bridge and permits rectification through that other bridge of six half cycles of the 400 c.p.s. power source. A seventh half cycle time period is utilized to provide the transfer or cross-over period between each count of six half cycles, as is shown in the wave diagram in FIGURE 3.

The following portion of this description will describe control circuit operation through a count of seven half cycles of the input power source and, as hereinbefore described, the assumption will be made that rectification will occur through the "positive" bridge 24. At the start of every half cycle of control circuit operation (seven input source half-cycles), the counter 70, see FIGURES 1 and 4A, will have been reset to its start condition and its outputs leads $A_o$, $B_1$ and $C_1$ will be at ground potential. The circuit to accomplish the periodic resetting of the counter 70 will be described hereinafter.

With reference to FIGURE 4A, when the current starts passing through the main winding 62 of the signal transforming 60, from line 28 to line 30, and induced current, via transformer secondary winding 64, forward biases a signal amplifier transistor Q1 and turns it "on" for approximately 50 to 100 micro-seconds. The transistion signal from Q1 passess via lead 98 through a diode gate 100, its output lead 101 and a pedestal gate 102 to trigger a 1.06 milli-second one-shot 104 (transistors Q3 and Q4), Q4 being turned "on" and Q3 being turned "off."

The transistor Q4 of one-shot 104 being "on" (at ground), its collector output lead 106, keeps the diode gate 100 at constant ground level which is a safety circuit to prevent any line noise transitions on the 400 cycle line from again triggering the one-shot 104 through its pedestal gate 102. Output lead 106 from one-shot 104 also connects to the trigger input of counter 70 and the pulse transition on lead 106, when Q4 turns "on," triggers the "A" register of counter 70, turning its transistor Q5 ($A_o$) "off" and Q6 ($A_1$) "on." When Q6 ($A_1$) goes positive it, in turn, triggers the "B" register of counter 70 and Q8 ($B_1$) is turned "off" while Q7 ($B_o$) is turned "on." The outputs of the C register are not changed by the first trigger pulse, so $C_o$ remains "off" and $C_1$ remains "on."

Thus the positive transition on the output of Q1 (see FIGURE 2) in response to sensing a power source half cycle, results in a count of "one" in binary counter 70 resulting in its output leads $A_0$, $B_1$, $C_0$ being "off" or negative and leads $A_1$, $B_0$, $C_1$ being "on" or at ground. The signal potential on leads $A_0$, $B_1$, $C_0$ is representative of a "one" count.

At the end of the 1.06 milli-second time period of one-shot 104, it resets to its initial condition with transistor Q3 turned "on" and Q4 turned "off." The positive going transition on output lead 108 of Q3 (of one-shot 104) at the end of the 1.06 milli-second delay, triggers a 105 micro-second delay 110, turning "off" its transistor Q38 which places a negative level at the emitters of both of signal amplifiers Q1 and Q2, effectively blocking their operation, thus preventing all signals and noise on the 400 cycle lines 28 and 30 from triggering the signal amplifier transistors Q1 and Q2 during the 105 micro-seconds. This action assures that a capacitor 112 and a resistor 114 (see FIGURE 4A) in the timing circuit of the 1.06 milli-second delay one-shot 104 will recharged.

Substantially the entire above described first half cycle of the 400 cycle input power is conducted in lines 28 and 30 after it has been sensed and counted by the control circuit. Thus, during the period of the first counted half cycle, the cross-over control register 72 is in a "reset" condition and (because we are asuming positive rectification) the cross-over D register 74 is conditioned so it inhibits only the "negative" gate 78. Also, the multiple pulse transitions from multivibrator 80 are permitted to pass via diode gate 76, the SCR control one-shots 89 and 90 and thence, via associated power amplifiers 93 and 94, through the primary windings 44 and 50 of the SCR control transformers T1 and T2. This multivibrator controlled multiple pulsing through T1 and T2 assures that the "positive" bridge SCR's 35 and 36 are gated "on," permitting positive rectification of the first half cycle of the 400 cycle power input through bridge 24 to the output terminals 22.

When the 400 cycle input current changes from positive to negative, current flow through the transformer primary winding 62 will reverse, going from line 30 to line 28, whereupon, by means of the second signal transformer secondary winding 66, a second signal amplifier transistor Q2 is turned on for approximately 50 to 100 micro-seconds and in a manner similar to the pulse transition which occurred for the positive half cycle, a pulse transition signal passes via lead 99 through the diode gate 100, its output lead 101 and pedestal gate 102 to again trigger the 1.06 milli-second delay one-shot 104. Transistor Q4 of the one-shot 104 against goes "on" for 1.06 milli-seconds and its transistor Q3 goes "off" for an equal length of time.

As before, the Q4 collector being now at ground maintains the diode gate 100 at ground thereby preventing any noise on the 400 cycle line from improperly triggering the one-shot 104.

Figure 2:
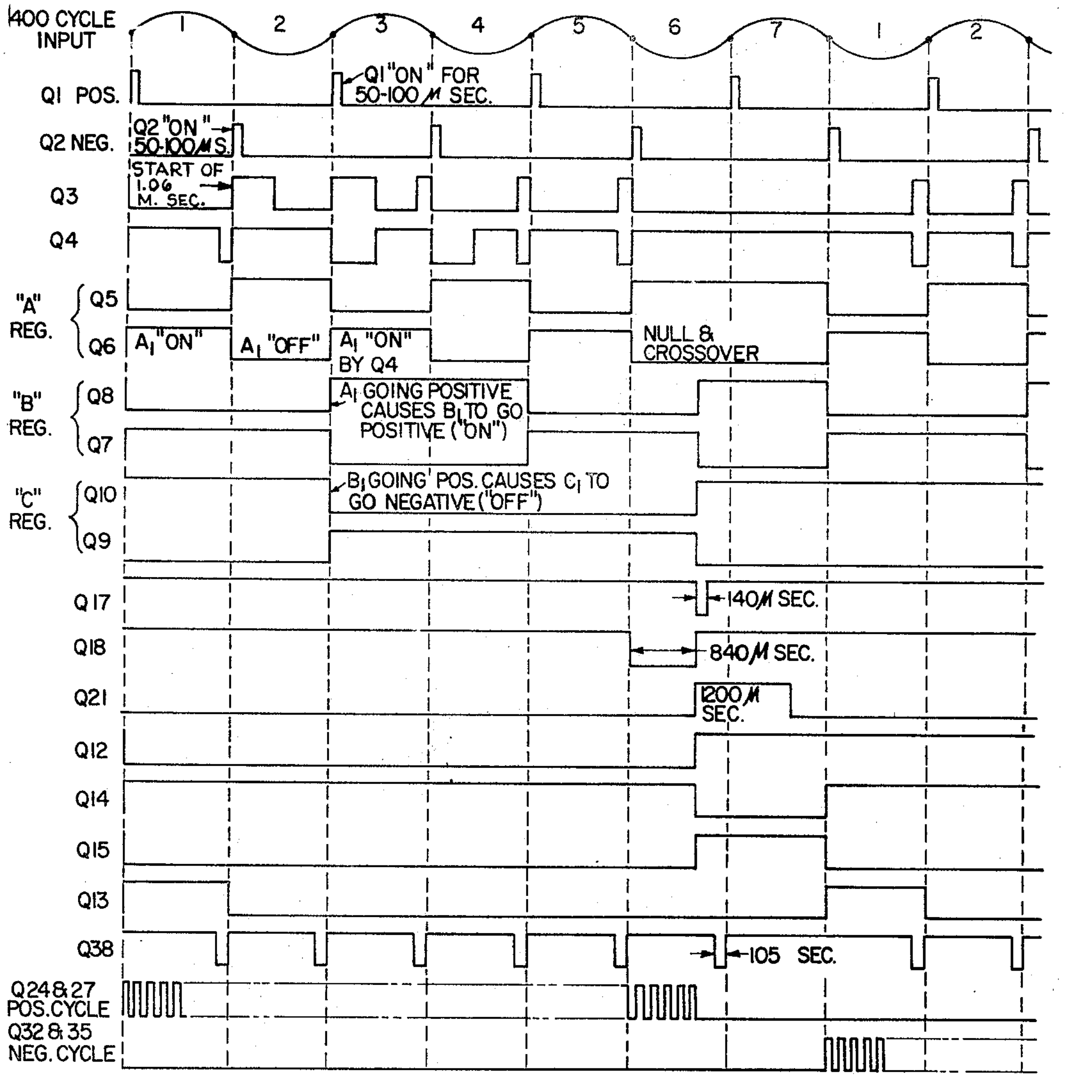
FIGURE 2 is a timing chart for the system illustrated in FIGURE 1.

Here again, during the transition period when Q4 goes positive, it triggers the A register of counter 70, which now turns transistor Q5 ($A_0$) "on" and turns transistor Q6 ($A_1$) "off." The B and C register conditions remain unchanged as shown on the timing diagram, FIGURE 2.

As occurred during the count of the first power input half-cycle, at the end of the 1.06 milli-second delay, the one-shot transistor Q3 turns "on" and Q4 turns "off" and the positive going transition at Q3 again triggers the 105 micro-second delay transistor Q38 for reasons as stated before; to assure recharging of the capacitor and the resistor RC timing circuit in the 1.06 milli-second delay one-shot 104 by complete blocking of transmission of signal pulses via transistors Q1 and Q2.

Nothing which occurs during the second power source half-cycle period of operation of the control circuit causes a change in the cross-over control register 72 and accordingly the bi-stable D register 74 does not change its condition. The multivibrator pulses, through diode gate 76 and the associated described circuitry maintain the "positive" bridge 24 gated "on" or operative and the second half-cycle of the high frequency power input is rectified in a positive sense.

The description up to this point, it will be noted, describes alternate signal pulses fed to transistors Q1 and Q2 in the form of a shifting current flow from line 28 to line 30 and from line 30 back to line 28, through signal transformer primary winding 62. This detailed description will serve to describe the control circuit operation for each successive half-cycle of input power up to the start of the sixth half-cycle and during each of the first five half-cycles the A.C. is rectified in the "positive" sense by the positive full-wave bridge 24.

At the start of the sixth half-cycle (a negative half-cycle) of the 400 cycle input source, the current changes polarity and passes from line 30 to line 28 through signal transformer primary winding 62 and via secondary winding 66, amplifier transistor Q2, lead 99, diode gate 100, lead 101 and pedestal gate 102, triggers the 1.06 milli-second delay one-shot 104 for the sixth time and one-shot transistor Q4 goes "on" and Q3 goes "off." The Q4 collector, being "on" (at ground) again holds the diode gate 100 at ground, for reasons previously described, for 1.06 milli-seconds.

Should the input frequency at terminals 20 be other than 400 cycles (±20 c.p.s.), the delay times at one-shots 104, 110, 122, 126, 132 would be changed to assure optimum operation; the positive transition of the one-shot transistor Q4 (after it triggers the A register of counter 70), Q5 ($A_0$) goes "on" and Q6 ($A_1$) goes "off" (see FIGURE 1). At this point in time, the start of the sixth half cycle, we are at a point *a* shown in FIGURE 3. Counter stage transistors Q6 ($A_1$), Q8 ($B_1$) and Q10 ($C_1$) are all "off" so the counter outputs $A_1$, $B_1$, $C_1$ are all negative.

As shown in FIGURES 1 and 4B, a cross-over diode gate 116, with its three inputs connected to counter output leads $A_1$, $B_1$, $C_1$, has its output connected to the input of an inverter 118. The instant that the three counter outputs $A_1$, $B_1$, $C_1$ are all negative (sixth count), gate 116 goes negative and turns "on" the inverter transistor Q19.

The positive going transition which occurs on the output lead 120 from the collector of transistor Q19 of the inverter 118 triggers the start of an 840 micro-second delay 122 and, at the end of the delay period, the collector lead 124 of its transistor Q18 goes positive (see FIGURE 2 timing chart). This occurs at point *b* in FIGURE 3, at about two-thirds through the sixth half-cycle. The pulse transition on lead 124 as it goes positive, causes three circuit functions to occur: (1) a 140 micro-second counter reset one-shot 126 is triggered; (2) via pedestal gate 128, the cross-over control register is triggered to its "set" condition; and (3) via a pedestal gate 130, a 1.2 milli-second delay one-shot 132 is triggered.

Counter reset

The positive going transition on the Q18 collector lead 124 turns the counter reset delay transistor Q17 "off" and it remains off for 140 micro-seconds, causing a negative voltage to exist at the collector of the counter reset transistor Q17 for this specific period of time during which counter registers A, B and C are reset, placing the counter transistors Q5, Q8 and Q10 in the "on" position, i.e., $A_0$, $B_1$ and $C_1$ are at ground which is the zero or starting condition of the counter.

Rectifier bridge cross-over

The positive going transition on lead 124 from the cross-over delay transistor Q18 triggers the cross-over control register 72 to its "set" condition whereupon its transistor Q14 goes "off" and Q15 goes "on" and, its output being at ground, inhibits both the "positive" and "negative" pulse control gates 76 and 78. The positive going transition of the collector output lead of transistor Q15 when the cross-over control register is "set" also triggers the D register, as has been described, turning its transistor Q12 ($D_1$) "off" and transistor Q11 ($D_o$) "on." Bear in mind, this action occurs approximately two-thirds through the sixth half cycle.

The multivibrator 80 has transistors Q22 and Q23 which are alternately continuously oscillating between "on" and "off." It will be recalled that the pulses from Q22 can be inhibited from gating the "positive" bridge 24 by placing a ground on lead 73 from cross-over control register 72 and on the $D_o$ output from D register 74. The pulses can also be inhibited from gating the "negative" bridge 26 by placing a ground register 72 on lead 73 and on the D register $D_1$ output.

Inasmuch as the cross-over control register 72 is now in its "set" condition, the ground level on its output lead 73 inhibits both the "positive" gate 76 and "negative" gate 78. This causes all pulse signals via transformers T1 and T2 to cease triggering the SCR's 35 and 36, but will not effect bridge rectification of the remainder of the sixth half cycle inasmuch as the bridge gating SCR's 35 and 36 were rendered conductive at the beginning of the sixth half cycle when the "positive" pulse control gate 76 was not inhibited and once the SCR's are gated "on" they remain on until the half cycle or wave reaches its null or cross-over point, and the current through the SCR's 35 and 36 falls below its holding current level. The SCR's remain "on" and will enable positive bridge rectification throughout the entire sixth half cycle. At the end of the sixth half cycle the "positive" bridge SCR's 35 and 36 go "off," and can no longer be gated "on" because the pulse control gate 76 is now inhibited.

Bearing in mind that the cross-over control register 72 is still in its "set" condition, it will be understood that both the "positive" and the "negative" pulse control gates are inhibited and all of the bridge controlling SCR's 35, 36, 37 and 38 will remain gated "off" so the two rectifying bridges 24 and 26 will be inoperative as long as the control register is not reset. This description is still at the point in time marked *b* in FIGURE 3.

The positive going transition on output lead 73 from the cross-over control register 72 caused the bi-stable D register to change its condition, i.e., lead $D_o$ is now "on" and $D_1$ is "off." The circuit is now ready for the control register to be reset (it is not yet reset) which will remove its inhibitions from gates 76 and 78 while the D register now inhibits the "positive" control gate 76 but not the "negative" control gate 78. Consequently under such conditions, the pulses from multivibrator 80 will be permitted to pass through the "negative" pulse control gate 78 to trigger the SCR's 37 and 38 in the negative bridge 26.

Returning to the positive going transition on the output lead 124 from the cross-over delay register 122, it will be recalled that, via pedestal gate 130, a 1.2 millisecond delay 132 was triggered. That action turned "on" its transistor Q21 and its other transistor Q20 went "off." The positive going transition on lead 134 from transistor Q21 of the 1.2 milli-second delay 132 sends a pulse to diode gate 100 but the gate 100 at this point is inhibited because the 1.06 milli-second delay from the sixth half-cycle triggering of one-shot 104 is still retaining transistor Q4 and its lead 106 at a ground level, which inhibits the gate 100 from passing the transition on lead 134. Lead 134 from Q21 remains positive for 1.2 millisecond from time point *b* in FIGURE 3, and thus holds the diode gate 100 at ground until the mid point of the seventh half cycle is complete, thereby preventing any signal form the 400 cycle line from triggering the one-shot 104 during the delay.

Just before the end of the sixth half-cycle, the one-shot 104 switches back to its initial position with Q4 "off" and Q3 "on." The 105 micro-second delay is again triggered by the output signal from Q3. However, its function is not necessary at this point because the 1.2 milli-second one-shot 132 is still inhibiting the diode gate 100. Because of the 1.2 milli-second inhibition of gate 100, the 50 to 100 micro-second signal through the signal amplifier transistor Q1, which is initiated at the start of the seventh half cycle, cannot pass the inhibited gate 100 to trigger the one-shot 104. Therefore (as depicted in FIGURE 2) the transistor Q4 of one-shot 104 remains "off," stays "off" during the entire seventh half cycle and no trigger pulse is passed via lead 106 to the counter 70, which remains in the reset condition with $A_o$, $B_1$ and $C_1$ "on" and $A_1$, $B_o$ and $C_o$ "off."

Figure 3:
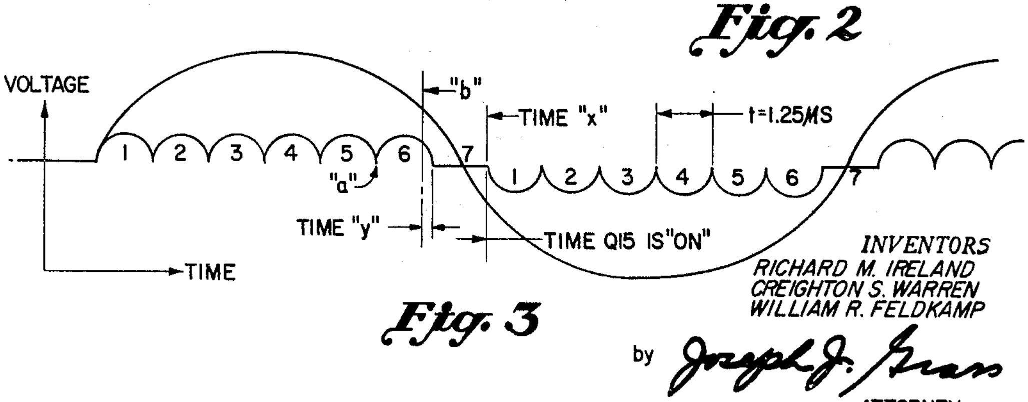
FIGURE 3 is a diagram illustrating the half cycle pulse count and the null-cross-over point occurring at a rectification gap between positive and negative rectification between the system input and output terminals.
Figure 4C:
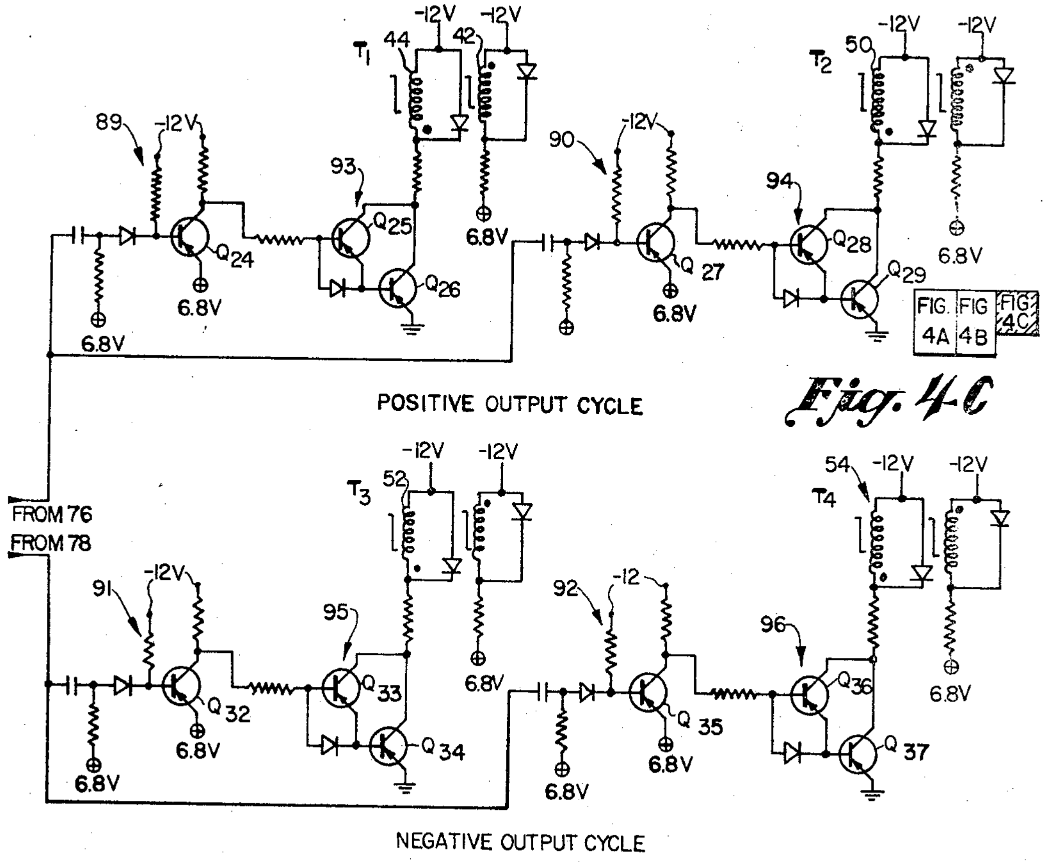

The control circuit operation is now past the time period Y, the last portion of the sixth half cycle, as shown in the timing diagram, FIGURE 3.

During the seventh half cycle, current passes through the signal transformer primary winding 62 from line 28 to line 30 and the amplifier transistor Q1 turns "on" for approximately 50 to 100 micro-seconds but, as has just been described, its signal is inhibited at diode gate 100 by the output of the 1.2 milli-second delay transistor Q21 whose lead 134 is at ground. Just before the end of the seventh half-cycle, the 1.2 milli-second delay 132 is completed and its transistor Q21 goes "off" removing the inhibiting potential from gate 100.

At the end of the seventh half cycle, i.e., when time point X in the wave diagram FIGURE 3 is reached, the first one of the next seven half cycles starts, and current will pass through the signal transformer 60 from line 30 to line 28 causing direction sensing amplifier transistor Q2 to turn "on" for approximately 50 to 100 micro-seconds. The signal from Q2 can now pass through the uninhibited diode gate 100 to trigger the delay one-shot 104, turning Q3 "off" for 1.06 milli-seconds and Q4 "on" for the same length of time. The Q4 collector lead 106 goes to ground, again inhibiting the diode gate 100, thus preventing false signals from noise on the 400 cycle line which might inadvertently trigger the delay one-shot 104.

When the one-shot transistor Q4 is turned "on," its positive transition will trigger the counter 70 to the next count one, i.e., in A register, it turns Q5 ($A_o$) "off" and Q6 ($A_1$) "on." When Q6 turned "on," its positive transition triggered the B register, turning Q8 ($B_1$) "off" and Q7 ($B_o$) "on."

Figure 5:
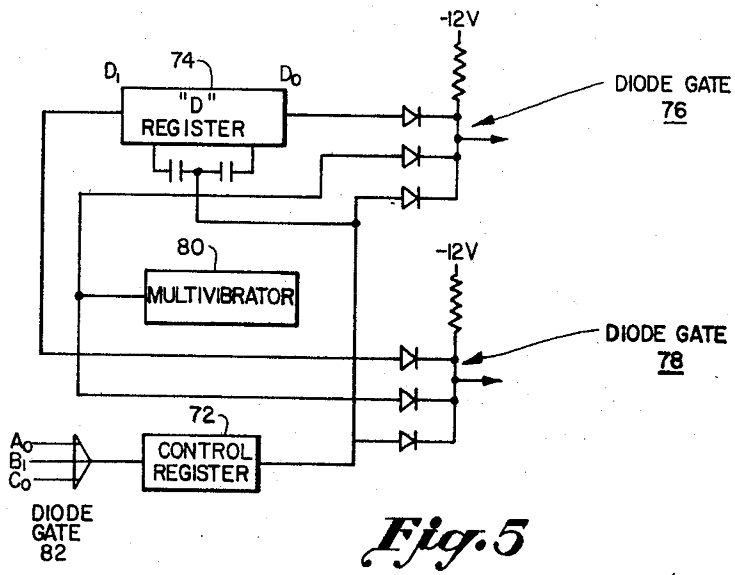
FIGURE 5 is a detail schematic diagram to more clearly illustrate the FIGURE 4B schematic arrangement of the "positive" and "negative" diode gates, by means of which the "positive" and "negative" bridges are rendered operative.

The combination of counter output leads $A_o$, $B_1$ and $C_o$ all being "off" or negative, when the count is "one," will trigger the diode OR gate 82 which turns transistor Q13 of inverter 84 "on." The positive transition of Q13 going to the "on" condition, through pedestal gate 86, resets the cross-over control register 72 (see FIGURE 2) so its transistor Q14 goes "on" and Q15 goes "off." When cross-over control register transistor Q15 goes "off" it removes the ground level inhibit potential from the diode gates 76 and 78, shown in FIGURE 5. However, "positive" diode gate 76 is now inhibited because transistor Q11 ($D_o$) of the D register 74 is "on" and places a ground potential on an input to the gate 76. "Negative" diode gate 78, on the other hand, is no longer inhibited because transistor Q12 ($D_1$) of the D register 74 is "off." Consequently, pulses from the multivibrator (FIGURE 3) pass through the "negative" diode gate 78 to trigger the SCR's 37 and 38 in the "negative" bridge 26.

This completes the description of system operation through a positive half-cycle and through the cross-over null to the start of the negative half-cycle of operation for a 57.14 c.p.s. output. During that time the gate controlling circuits of the SCR's 35 and 36 in the positive bridge 24 were pulsed for the first six of seven of the 400 c.p.s. half-cycles. The "positive" SCR gate control circuits include transistors Q24 through Q29 shown in FIGURE 4C.

Operation to provide the negative half-cycle for the 57.14 c.p.s. output is substantially identical to that for providing the positive output half-cycle excepting that the gate control circuits of the alternate SCR's 37 and 38 for the negative bridge 26 will be pulsed, such gate control circuits including transistors Q32 and Q37 shown in FIGURE 4C.

The control circuits use D.C. power at several levels. The source of such D.C. is not per se a part of this invention and therefore is not illustrated. D.C. can be obtained from a self-contained power pack deriving its input power from the A.C. input power source or if the frequency converter is used in conjunction with data communication equipment, the D.C. power pack normally present in such associated equipment can be used as the source of operating D.C.

In any event, when D.C. power is first applied to the control system a delay steering one-shot 140, shown in FIGURE 4B just above the motor control switch 88, places a momentary ground level on the collector lead of transistor Q15 in the cross-over control register 72 to assure the control register being in its "set" condition with transistors Q15 and Q14, "on" and "off," respectively, as soon as the control system has operating power applied. With the circuit so conditioned, and only when the motor control switch 88 is placed "on," the 400 c.p.s. power input half-cycles will be sensed and counted until the counter output is negative on each of leads $A_0$, $B_1$, $C_0$ whereupon the cross-over control register 72 will be reset and rectifications via one or the other but only one of bridges 24 and 26 will occur, as has been hereinbefore described.

In the exemplary disclosure the 3-stage counter 70 will enable a count of eight which is sufficient to accomplish a change in frequency from 400 c.p.s. to approximately 60 c.p.s. in accord with this invention. However, it is readily apparent that more or less stages could be provided to accommodate different values of input and output frequencies.

The invention may be embodied in other specific forms without departing from the spirit or essential characteristics thereof. The present embodiment is therefore to be considered in all respects as illustrative and not restrictive.

What is claimed and desired to be secured by Letters Patent is:

1. A frequency convertor adapted to provide direct connection from a high frequency alternating current power source through solid state frequency conversion circuits to a lower frequency load output, said frequency conversion circuits comprising: two full-wave gate controlled rectifier bridges of opposite rectifying polarity connected in parallel between power source input terminals and the load output terminals; and a control circuit for alternatively rendering said bridges operative including a counter circuit and bridge switching register means, the counter circuit being connected to count successive half cycles of the input power source and the switching register means being cyclically and successively responsive to a predetermined count of said half cycles to alternately render only one of the bridges operative for positive rectification of a predetermined number of input source half cycles and thereafter to render only the other of the bridges operative for negative rectification of the same predetermined number of input half cycles, said control circuit also including inhibiting circuitry responsive to said predetermined count in such counter circuit to render both said bridges inoperative for at least one-half of an input cycle whenever the operative and inoperative conditions of said two bridges are reversed.

2. A frequency convertor as defined in claim 1, wherein said switching register means includes manual control circuit on-off switch means.

3. A frequency convertor for changing A.C. power to a lower frequency A.C. output comprising: positive and negative unidirectional current flow means each including a power input circuit and a power output circuit, all of said power input circuits being connected in parallel to a high frequency A.C. power source and all of said power output circuits being connected in parallel to a lower frequency output circuit; and control means coupled with said unidirectional current flow means for selectively conditioning said unidirectional current flow means to alternatively render only one and thereafter only the other of said positive and said negative unidirectional current flow means operative to pass input current for a predetermined time period, said control means comprising means for sensing power source frequency representations, a counter for counting said representations, said counter having outputs which represent the count, gate means connected to a group of counter outputs representative of said predetermined count to provide a control signal when said predetermined count is reached, and means responsive to said control signal for alternatively conditioning said positive and negative unidirectional current flow means to provide alternate positive and negative current flow to said lower frequency output circuit.

4. A frequency convertor as defined in claim 3, wherein said means for sensing said power source frequency representations comprises a square loop core transformer with a primary winding shunt connected, in series with a load resistor, across said input circuit and having at least one secondary winding providing an induced signal pulse for each cycle of power input current; and amplifier and gating means connected between said secondary winding and said counting means providing trigger pulses to said counting means.

5. A frequency convertor as defined in claim 4, wherein a controlled amplifier is provided for said secondary winding with the secondary winding connected to its input and its output connected to an input of a multiple input inhibiting gate; the output of said inhibiting gate being connected to the input of said counting means; and further including triggering means actuated by the output of said inhibiting gate for selectively applying an inhibiting potential to an input of said inhibiting gate to thereby suppress false signals which might otherwise be supplied to said counting means.

6. A frequency convertor as defined in claim 5, wherein said trigger means is a timed one-shot having one of its outputs connected to the input of said counting means and to an input of said inhibiting gate, said triggered output reaching at least the inhibiting potential threshold level required to inhibit said inhibiting gate and having a time period less than one-half the reciprocal of the power input frequency.

7. A frequency convertor as defined in claim 3, wherein: the control signal provided by the gate means also resets the counter.

8. A frequency convertor as defined in claim 3 wherein said means responsive to said control signal includes register means having pulse generating means, first and second gates having inputs connected to said pulse generating means and having outputs connected respectively to the primary windings of the transformers associated with said positive and negative unidirectional current flow means, and a bistable register with its two outputs connected respectively to inputs of said first and second gates, said bistable register being arranged to change its state in response to said control signal.

9. A frequency convertor as defined in claim 3, wherein said means responsive to said control signal includes register means having a bistable register with its two outputs connected respectively to said positive and negative unidirectional current flow means by appropriate coupling circuit means, said bistable register being arranged to change its state in response to said control signal.

10. A frequency convertor as defined in claim 9, wherein said register means further includes: a cross-over control register responsive to said control signal to change to a set condition, and having a reset circuit including a gate connected to specific counter outputs and responsive to a second predetermined count condition in said counter, said cross-over control register being connected to and adapted to place an inhibiting potential on both of said coupling circuit means as long as said cross-over control register remains in its set condition, thereby rendering said positive and negative unidirectional current flow means inoperative and preventing output current flow during this interval.

11. A frequency convertor as defined in claim 9 wherein a timed one-shot is actuated by said control signal to inhibit said means for sensing power source frequency representations for a predetermined time period sufficient to prevent at least one count from reaching said counter thereby delaying the counter by one count.

12. A frequency convertor as defined in claim 10, wherein the cross-over control register reset circuit includes a gate whereby the cross-over control register reset circuit can be rendered inoperative, thereby providing "on-off" control of the reduced frequency output.

13. A frequency convertor as defined in claim 3 wherein each of said positive and negative unidirectional current flow means includes at least one gate controlled rectifier and at least one square loop core signal transformer having at least a signal input primary winding and a signal output secondary winding, the secondary winding connecting to the gating circuit of a gate controlled rectifier, whereby said unidirectional current flow means can be remotely controlled by signals applied to said primary winding.

14. A frequency convertor as defined in claim 13, wherein each of said square loop core signal transformers includes a reverse bias winding assuring a positive signal cut-off near the end of each control pulse in the associated primary winding.

15. A frequency convertor for changing A.C. power to a lower frequency A.C. output comprising: a direct circuit including positive and negative rectifier bridge means connected in series with control gate means, each bridge means including a power input circuit and a power output circuit, all of said input circuits being connected in parallel and adapted to be connected to a high frequency A.C. power source and all of said output circuits being connected in parallel and adapted to be connected to an output circuit; and control means coupled to said controlled rectifier bridge means for selectively conditioning said control gate means to alternately render only one and thereafter only the other of said positive and said negative bridge means operative to rectify input current for a predetermined time period.

16. A frequency convertor as defined in claim 15, wherein said control gate means comprise controllable rectifier means for each of said bridge means, each controllable rectifier means being series connected to the output of its associated said bridge means.

17. A frequency convertor as defined in claim 15, wherein filter means are provided and are connected from each side of said power source to each side of said power frequency output circuit.

18. A frequency convertor as defined in claim 15, wherein each of said rectifier bridge means is a full wave rectifier.

19. A frequency convertor as claimed in claim 18, wherein said control gate means comprises controllable rectifier means for each of said rectifier bridge means, each controllable rectifier means being series connected in said output circuit of its associated said bridge means, and each of said controllable rectifier means enabling blocking of current flow through the associated said full wave bridge.

20. A frequency convertor as defined in claim 19, wherein each said controllable rectifier means comprises an SCR connected in series with each of the output connections of the associated said rectifier bridge means.

21. A frequency convertor for coupling a high-frequency A.C. power source to a lower frequency A.C. load comprising gate controlled rectifying bridges having opposite polarity outputs connected in parallel, and having inputs connected in parallel to the high-frequency A.C. power source; and control circuit means for alternatively rendering the control gate of said rectifier bridges currectification at one polarity of a specified number of half cycles in the high-frequency source to thereby enable rectification at one polarity of a specified number of helf cycles of high-frequency power and then rectification at the other polarity of an equivalent number of half cycles of high-frequency power; said control circuit means further including an inhibiting means enabling a period of zero output rectification to provide a time space interval between rectification of opposite polarity by said bridges.

References Cited

UNITED STATES PATENTS

| | | | |
|---|---|---|---|
| 3,246,231 | 4/1966 | Clarke | 321—61 X |
| 3,287,622 | 11/1966 | Eckenfelder et al. | 321—69 |
| 3,321,693 | 5/1967 | Heinrich et al. | 321—5 |
| 3,355,647 | 11/1967 | Braus | 321—61 X |
| 3,324,375 | 6/1967 | Pearce | 321—7 |

J. D. TRAMMELL, Primary Examiner

G. GOLDBERG, Assistant Examiner

U.S. Cl. X.R.

307—220, 233, 271; 318—171; 321—69

PO-1050
(5/69)

UNITED STATES PATENT OFFICE
CERTIFICATE OF CORRECTION

Patent No. 3,493,843 Dated February 3, 1970

Inventor(s) Richard M. Ireland, Creighton S. Warren and William R. Feldkamp

It is certified that error appears in the above-identified patent and that said Letters Patent are hereby corrected as shown below:

Col. 6, line 51 - "forming" should read --former--.

Col. 6, line 55 - "passess" should read --passes-.

Col. 7, line 18 - "recharged" should read --recharge--.

Col. 7, line 48 - "against" should read --again--.

Col. 9, line 35 - "inhibted" should read --inhibited--.

Col. 14, line 27 - before "rectification" insert --rent conductive responsive to the time division of the half cycles in the high-frequency source to thereby enable--.

Col. 14, line 28 - delete "in the high-frequency source to thereby enable";
line 29 - delete "rectification at one polarity of a specified number of helf";
line 30 - delete "cycles".

SIGNED AND SEALED

JUL 7 1970

(SEAL)
Attest:

Edward M. Fletcher, Jr.
Attesting Officer

WILLIAM E. SCHUYLER, JR.
Commissioner of Patents